Dec. 2, 1930.  E. T. J. TAPP  1,783,890

SELF PROPELLED ROAD VEHICLE

Filed Jan. 29, 1930

INVENTOR.

Ernest T. J. Tapp.
By William C. Linton
Attorney.

Patented Dec. 2, 1930

1,783,890

UNITED STATES PATENT OFFICE

ERNEST THOMAS JAMES TAPP, OF LONDON, ENGLAND

SELF-PROPELLED ROAD VEHICLE

Application filed January 29, 1930, Serial No. 424,401, and in Great Britain November 5, 1928.

This invention relates to self-propelled road vehicles of the type wherein the rear axles are attached to the chassis by compensating spring mountings.

The objects of the invention are to provide a simple and effective device which, acting in conjunction with the springs and their attachments, will relieve the said springs and their attachments of certain undesirable strains and at the same time allow freedom of movement to conform to road inequalities whilst keeping the direction of travel as constant as may be desirable and/or to prevent or restrict, to desired limits, lateral movement of one axle relative to the other.

To this end, one or more pairs of members, hereinafter referred to as tracking members, arranged in the form of a V, are provided between the rear axles, the apex of the V being connected by a turning and/or sliding joint disposed at or near the centre of one axle or cross bar disposed between said axles and the open extremities thereof, being connected at or near the opposite ends of the other axle or to the compensating spring mountings.

The said tracking members may be in the form of one V- or Y-shaped stay rod or two separate rods.

Figure 1:
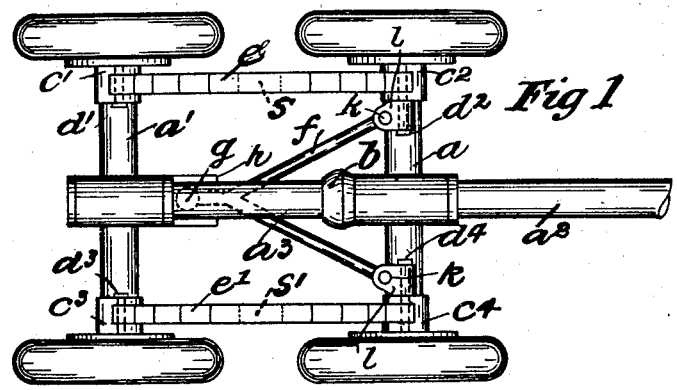
Figure 2:
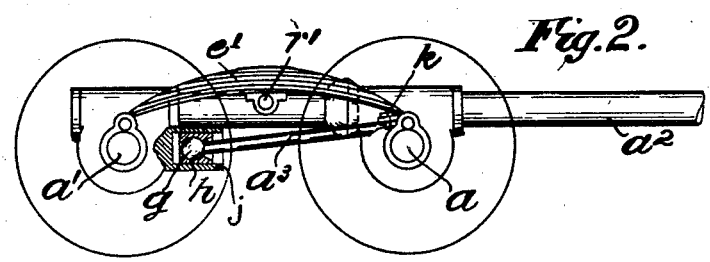
Figure 3:
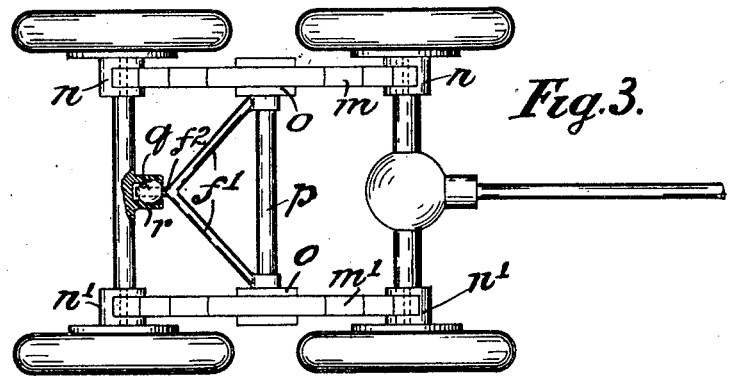
Figure 4:
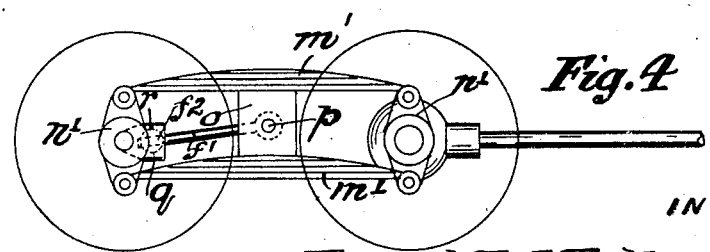

The invention will now be described with reference to the accompanying diagrammatic drawings in which Figures 1 and 2 show in plan and elevation one form of the invention, and Figures 3 and 4 show similar views to Figures 1 and 2 showing a modified form of the invention.

Referring first to Figures 1 and 2, the invention is shown as applied to a type of vehicle in which there are two driven axles $a$, $a'$ positioned longitudinally by torque tubes $a^2$ and $a^3$ respectively. The fore axle torque tube $a^2$ is attached by means of a ball joint (not shown) to the chassis, and the rear axle torque tube $a^3$ is attached by a ball joint $b$ to the rear of the fore axle $a$. The drive to the rear axle $a'$ is taken from an extended worm shaft in the fore axle $a$ through a universal joint working inside the ball joint $b$.

The said axles $a$, $a'$ are anchored by means of four shackles $c^1$, $c^2$, $c^3$, $c^4$, and pins $d^1$, $d^2$, $d^3$, $d^4$, to two springs $e$, $e'$ attached to the chassis near their centres by pivot joints $s$ and $s'$.

Stay rods $f$ are of the Y formation with a ball $g$ at the extremity of the stem. The said ball $g$ rests in a socket in the cylindrical plunger $h$ free to slide in a cylindrical guide $j$ fixed just in front of the differential case under the torque tube of the rear axle.

The other extremities of the rods $f$ are formed into two eyes which are attached by pins or bolts $k$ to two hinge pieces $l$ which in turn are secured by the two spring pins $d^2$, $d^4$, these pins being of sufficient length to serve the double purpose of anchoring the springs $e$, $e'$ as well as the hinge pieces $l$.

The said hinge pieces are employed to allow the rods $f$ to spring without straining the pins $d^2$, $d^4$, and/or to simplify alignment on to the said pins.

Now since the two springs and axles form a rectangle as seen in plan, a force applied to one corner of the said rectangle (as for instance when a lateral thrust occurs against one wheel) will tend to make the rectangle assume a rhomboid formation with a consequent strain on the spring attachment due to distortion.

With the device in action however, a triangle is formed by the rods $f$ on an imaginary base line joining $d^2$ to $d^4$.

It will be seen now that any side thrusts on $d^2$ for instance, will be communicated by the apex of the said triangle to the other axle, thus preventing or limiting distortion. As it is necessary to allow independent rocking action of each axle to conform to road inequalities, and further that the device should not act as a radius rod (this function being fulfilled by the torque tube), the sliding ball joint is provided at the apex. Thus the device prevents or limits relative lateral distortion only and restricts no other movement.

The usual known methods of strengthening the torque tube by strut or torque rods is omitted for the sake of clearness.

Referring to Figures 3 and 4, the invention is shown as applied to a vehicle in which the fore and rear axles are anchored to two pairs of springs $m, m,$ and $m', m',$ by means of links $n, n',$ connecting the ends of the springs $m, m'$ to each other and to the axles. The said springs are anchored to the chassis by means of blocks $o$ working on a cross bar $p.$ In this example, the stay rods $f'$ pivot about the said cross bar $p.$ The stem $f^2$ of the Y-shaped stay rods is in the form of a plain pin free to slide through the ball $q$ which is free to turn in a socket $r$ attached to the rear axle.

What I claim is:—

1. In a road vehicle a pair of rear axles, springs secured to said axles, pins securing said springs to one of said axles and having a portion extended to project from one side of said springs and in parallel relation to said mentioned axle, a rigid triangular member arranged between the axles, means having bearing upon the extended portion of said pins and hingedly connecting the base of said triangular member to said pins, and a longitudinally slidable joint pivotally connecting the apex of said triangular member to the remaining axle, whereby transverse movement of one of said axles is transmitted through the triangular member to the other axle.

2. In a road vehicle, a pair of rear axles, springs secured to said axles, pins securing said springs to one of said axles and having a portion extended to project from one side of said springs and in parallel relation to said mentioned axle, a rigid triangular member arranged between the axles, means having bearing upon the extended portion of said pins and hingedly connecting the base of said triangular member to the pins, an enlarged head formed with the apex of said triangular member, a hollow socket supported intermediately of and upon the remaining axle, a piston-like member mounted for reciprocating movement within said socket and having rotatable engagement with the enlarged head upon the apex of the triangular member, whereby transverse movement of one of said axles is transmitted through the triangular member to the other axle.

In testimony whereof he affixes his signature.

ERNEST THOMAS JAMES TAPP.